United States Patent [19]

Bishop et al.

[11] Patent Number: 4,651,551
[45] Date of Patent: Mar. 24, 1987

[54] MEANS FOR MANUFACTURING COMPONENTS OF ROTARY VALVES

[75] Inventors: Arthur E. Bishop, 17 Burton Street, Mosman, N.S.W.; Klaus J. Roeske, Sydney, both of Australia

[73] Assignee: Arthur E. Bishop, Australia

[21] Appl. No.: 783,557

[22] Filed: Oct. 3, 1985

[30] Foreign Application Priority Data

Oct. 4, 1984 [AU] Australia .................. PG7491

[51] Int. Cl.$^4$ ............................................. B21K 1/24
[52] U.S. Cl. ................................. 72/189; 29/156.7 R
[58] Field of Search ............... 72/121, 189, 224, 247, 72/402, 406; 29/157.1 R, 156.7 R

[56] References Cited

U.S. PATENT DOCUMENTS

| | | | |
|---|---|---|---|
| 685,417 | 10/1901 | Williams | 72/189 |
| 2,680,391 | 6/1954 | Kaiser | 72/189 |
| 2,781,678 | 2/1957 | Nichols et al. | 72/189 |
| 3,763,688 | 10/1973 | Cuq | 72/402 |
| 3,987,657 | 10/1976 | Properzi | 72/247 |
| 4,100,785 | 7/1978 | Bishop | 72/189 |

*Primary Examiner*—Lowell A. Larson

*Attorney, Agent, or Firm*—Hill, Van Santen, Steadman & Simpson

[57] ABSTRACT

A die head for a roll imprinting machine for the imprinting of edges of grooves performed in a valve core for a rotary valve for use in a power steering gear, the die head supporting a circular cluster of radially disposed rolling die holders, each die holder carrying at an inner end an arcuate imprinting die and being mounted for partial rotation on a transversely extending axle, partial rotation of all said die holders being effected synchronously by action on each die holder at a position on the idle holder more remote from the inner end of the die holder than the position of the axle and a valve core locator arranged to locate and hold the valve core at the center of the cluster for roll imprinting by the imprinting dies in a synchronous relationship and apparatus for actuating the die head including a number of racks, one for each die holder, supported for reciprocating motion in engagement with sectors of gear teeth formed on the die holders, a work spindle extending along the central axis of the cluster and, a valve core holder, the racks, the work spindle and the valve core holder being reciprocated in coordinated motions according to a predetermined relationship.

8 Claims, 12 Drawing Figures

MEANS FOR MANUFACTURING COMPONENTS OF ROTARY VALVES

This invention relates to the manufacture of valve cores for rotary valves for use in power steering gear for vehicles. Such valves employ a sleeve member having in its inner surface several blind ended longitudinal slots and a valve core which has, on its outer surface, a corresponding set of grooves.

The edges of the sleeve slots and the grooves in the valve core are so juxtaposed as to direct and meter the flow of oil within the valve as slight relative rotation between the valve members occurs. Typically such valves, when in operation in straight ahead driving of the vehicle, have these two valve elements biased towards a spring centered neutral position by a torsion bar, as for example shown in U.S. Pat. No. 3,022,722. Such spring centering is linear so that relative rotation of the valve elements is directly proportional to the torque applied to the steering wheel.

In order to improve the characteristics of such valves it has become accepted that the groove edges of the valve core be specifically shaped to meter or regulate the flow of oil in a non-linear fashion, as for example, is shown in the specification of U.S. Pat. No. 3,591,136. According to the invention disclosed in that specification, at least part of the length of the groove edges of the valve core lie substantially radial to the valve core surface, but are contoured along their length to provide a variable rate of flow cut-off as they move relative to the juxtaposed sleeve slot edges. As further described in that specification, such edges may be shaped, at least over part of their lengths, in the form of a logarithmic scroll so as to cause the valve to simulate the operation of the more complicated hydraulic reaction valves widely accepted as providing optimum valve performance characteristics.

The specification shows a means of making valve cores having groove edges of the complex shape just referred to by first milling a series of blind-ended grooves and then imprinting all edges of these slots simultaneously by longitudinal rolling with imprinting dies of an appropriate complex shape. Valve cores made by this method have been widely used in integral steering gears for several years, but are proving unsatisfactory for use in rack and pinion power steering gears now being widely adopted, because of the hissing sound produced by the shape of the groove edges of such valves when controlling the flow of oil at high pressures, as when parking. Such rack and pinion steering gears are usually mounted directly on the bulkhead and any noises are readily transmitted to the driver.

It has been found that these noises can be greatly reduced if the groove edges are contoured in section so as to distribute the oil flow in a thin sheet or "feather". This is accomplished by having the groove edges which are operating at high pressure formed in such a manner that they are of substantially the same cross-section along their entire length, hence avoiding the "pocketed" configurations such as those shown in the specification of U.S. Pat. No. 3,591,136.

Examples of the use of this feather metering technique are to be found in several Japanese manufactured power steering gears, where the valve core groove edges are profile ground by causing a cylindrical grinding wheel having its axis of rotation parallel to the valve core to move in and out from the valve core axis as it is rotated in engagement with the wheel. However, this method of manufacture cannot, because of geometry limitations, provide the contour valve core groove edges required to simulate the hydraulic reaction type valves referred to above.

A method of making valve components with valve core groove edges of a more sophisticated cross section than possible with the ground meter is shown in the specification of U.S. Pat. No. 4,103,407 and also in that of West German Pat. No. 3,137,367. These patents both claim that the methods taught therein may be used to form substantially any contour of groove edge by simply impressing a tool, having a profile which is the obverse of that required, radially into a valve core blank in which grooves have been previously milled.

However, in practice, these methods are not suited to the impressing of feather groove edges of valve cores needed for quiet operation because of the great difficulty in holding the depth dimension of the imprinting sufficiently accurately. This is because, by radially imprinting the whole length at once as provided in these two specifications, the radial forces are very high and elastic yielding of the valve core occurs with resulting variation of depth, both from piece to piece and also along the length of an individual valve core.

The specification of U.S. Pat. No. 4,103,407 appears to address this problem by providing that the radially arranged imprinting tools stop on the outside surface of the precision ground valve core blank. However, this only means that the diametral tolerance of the valve core blank is added to the variation of radial distance between the formed groove edge of the valve core and the juxtaposed edge of the sleeve slot when in operation in the steering gear.

The specification of West German Pat. No. 3,137,367 draws attention to the limitation of U.S. Pat. No. 4,103,407 and purports to overcome the problem by stopping the radial travel of the tools within the radial imprinting press. However, the amount of elastic radial deformation of the valve core, when forming, still far exceeds that which can be tolerated for the manufacture of feather groove edges.

In contrast to these shortcomings, the method of rolling the metering edges as shown in the specification of U.S. Pat. No. 3,800,386 using the apparatus described in the U.S. divisional Pat. No. 4,100,785 is much more suited to the manufacture of valve cores having such feather metering in that, as is well known in the art of metal forming, much less intensity of pressure is required in progressive forming than in direct compression forming or coining. Not only is the intensity of pressure less, but because only one small section of the groove edge is being worked at any one instant, the forming load is further reduced. The total order of gain in accuracy resulting from reduction of elastic deformation during forming by this method can, as compared with the other referenced methods, be as great as four or five.

Note that all of the foregoing specifications relate to the manufacture of valve cores having six grooves whereas, in order to achieve a maximum distribution of oil flow, and hence attenuation of vavle hiss, it is preferable to use at least eight slots.

In U.S. Pat. Nos. 3,800,386 and 4,100,785 six equally spaced rolling dies are provided each having a convex arcuate surface with two forming edges which are so contoured as to be the obverse of the edges at each side of a groove to be formed.

These dies are carried in wedge shaped die blocks supported pivotally about the axes of six semi-cylindrical fulcrums secured to the inner periphery of an annular die headstock. The valve core to be formed is held in a collet within a spindle which is reciprocated axially by a hydraulic cylinder. Cam-like protrusions from the hydraulic cylinder engage abutments in the die blocks to control their pivotal movement in co-ordinated relationship with the reciprocation of the spindle.

The imprinting dies are housed in open ended slots in the die blocks. In order to overcome the obvious weakness of such an arrangement and to avoid the spreading of the slots under the load of imprinting, the die blocks are provided with conical faces which bear one upon the other. Such an arrangement is particularly unsuited in die heads employing eight rolls.

In one preferred form of the present invention eight rolls are employed and are of smaller radius than is possible in the earlier invention so further localising the forming pressure and so reducing the elastic deformation of the valve core being formed. This is accomplished by removing the cam like device used to co-ordinate the rolling of the dies and the reciprocation of the spindle, to a remote point within the machine.

The semi-cylindrical fulcrums are replaced by circular axles having conical journal section. Each imprinting die, formerly carried in a wedge shaped die block is now housed in a near circular die holder having on its inner facing periphery a blind ended pocket to receive the imprinting die and, diametrically opposed thereto, a short sector of gear teeth. These teeth engage a rack reciprocable within the die head.

The racks, one for each die holder, are carried by a spider arranged coaxially with the spindle and which is caused to reciprocate according to a predetermined relationship with the reciprocation of the spindle, but in the opposite direction. This spider is moved by a system of cams which provide precise co-ordination between the movement of the spindle and the rotation of the die holders in accordance with the precise effective pitch radius of the imprinting die. This may, of course, vary along the length of the groove being rolled and the cam profiles may be suitably adjusted to accomodate this variation. However, in the separating of the cam means from the simplistic arrangement shown in the specification of U.S. Pat. Nos. 3,800,386 and 4,100,785, several new and important objectives can be met.

1. A construction may be used in which the rolling radius of the imprinting dies may be substantially reduced.

2. The sequence of axial movements of the valve core and co-ordinated partial rotation of the die holders and means to automatically transport valve cores from a loading station to and from the die head are provided in manner not possible with the earlier concept.

3. A construction of die holder is provided which allows the use of eight rolls rather than six whilst still assuring accurate side constraint of the forming tools relative to the die holder and of the die holders relative to the die head, thereby assuring accurate spacing.

4. A construction of a die head may be used which permits the independent sideways adjustment of each of the die holders and associated imprinting tools in a manner not possible with the earlier construction where the die holders bore one upon the other.

The present invention consists in a die head for a roll imprinting machine for the imprinting of edges of grooves preformed in a valve core for a rotary valve for use in a power steering gear, the die head having means supporting a circular cluster of radially disposed rolling die holders, each die holder carrying at an inner end an arcuate imprinting die and being mounted for partial rotation on a transversely extending axle, means for effecting partial rotation of all said die holders synchronously, said means being arranged to act on each die holder at a position on the die holder more remote from the inner end of the die holder than the position of the axle and valve core locating means arranged to locate and hold said valve core at the center of said cluster for roll imprinting by said imprinting dies in a synchronous relationship.

The present invention further consists in apparatus for the imprinting of edges of grooves preformed in a valve core for a rotary valve for use in a power steering gear comprising a die head incorporating a circular cluster of radially disposed rolling die holders each carrying at an inner end an arcuate imprinting die mounted for partial rotation in the die head and having an outer periphery on which is formed a sector of gear teeth, a plurality of racks supported for reciprocating motion in engagement with said sectors of gear teeth, a work spindle extending along the central axis of said cluster, the work spindle having at one end valve core holding means, means for reciprocating said racks simultaneously, means for reciprocating said work spindle and means for coordinating said reciprocating motions according to a predetermined relationship.

In order that the nature of the invention may be better understood a preferred form thereof is hereinafter described, by way of example, with reference to the accompanying diagrammatic drawings in which.

Figure 1:
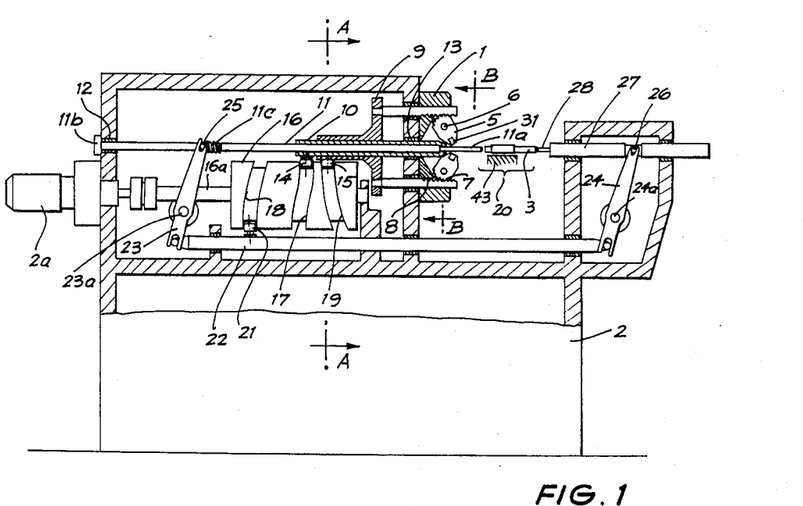
FIG. 1 is a part sectional elevation of the machine.
Figure 2:
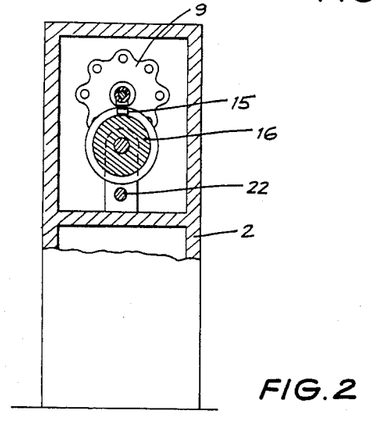
FIG. 2 is a section on line AA of FIG. 1.

The arrangement of a roll imprinting machine made according to the invention is shown in FIGS. 1 and 2. It comprises two main elements: a die head 1 and a machine base/operating mechanism 2.

Valve core 3 is here shown resting on loading platform 43 on completion of the roll imprinting operation. Die head 1 incorporates a cluster of eight radially disposed imprinting dies 31 each housed in a die holder 5 and journalled on axles 6 rigidly secured to die head 1.

Each die holder 5 has, on its outer periphery, a sector of gear teeth 7 each engaging a rack 8 secured to spider 9.

Spider 9 is slidably journalled on spindle 10 which itself is slidably journalled on arbor 11. This arbor is carried at the rear of the machine in journal 12 and at the front of the machine is supported by virtue of being slidably journalled within the hollow spindle 10 itself journalled in base 2 as at 13. Spindle 10 has protruding from its underside and secured thereto cam follower 14 engaged in cam track 17 of scroll cam 16. Keying means, for example in journal 13, ensures that cam follower 14 is retained in the downward position shown.

Spider 9 has a rearwardly extending cylindrical portion surrounding work spindle 10 and has, secured thereto, cam follower 15 which engages cam track 19.

Arbor 11 is moved axially by reason of its engagement with slot 25 at the upper end of lever 23. Lever 23 is pivoted at 23a in machine base 2, and has a slot at its lower end engaging in reciprocating link rod 22. At its opposite end link rod 22 similarly engages lever 24 pivoted at 24a. The upper end of lever 24 has a slot 26 which engages a pin in tailstock spindle 27 which carries center 28. It is thus apparent that arbor 11, carrying at its forward end centre 11a, and tailstock spindle 27, carrying centre 28, move in a co-ordinated fashion upon reciprocation of link rod 22. This reciprocation is controlled by the engagement of cam follower 21 in cam track 18 of scoll cam 16.

Because levers 23 and 24 are of identical lengths, centres 11a and 28 will maintain a constant separation, whereas it is desired that, with the mechanism in the loading position indicated in FIG. 1 at least one centre is withdrawn from valve core 3. To this end, the connection between slot 25 and arbor 11 incorporates a spring 11c which deflects upon stop 11b of arbor 11 contacting the left-hand end of machine base 2. Thus the valve core 3 is free to rest on loading platform 43 where it may be removed and replaced by the next component either manually or automatically by a loading mechanism not shown.

Scroll cam 16 is mounted on cam shaft 16a, which is suitably journalled in base 2 and is driven by a combined electric motor/reduction gear box 2a mounted on the rear of machine base 2. When in operation, scroll cam 16 rotates continuously to perform automatically all sequential operations needed.

Figure 3:
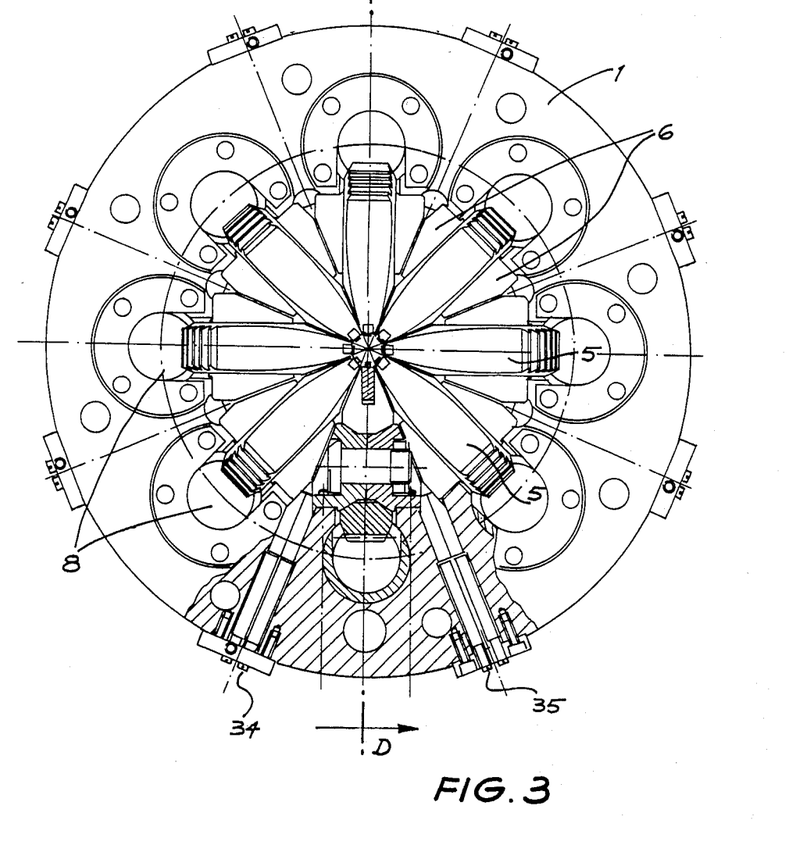
FIG. 3 is an end view of the die head part of the machine shown in FIG. 1, partly in section on line BB.
Figures 4, 4A:
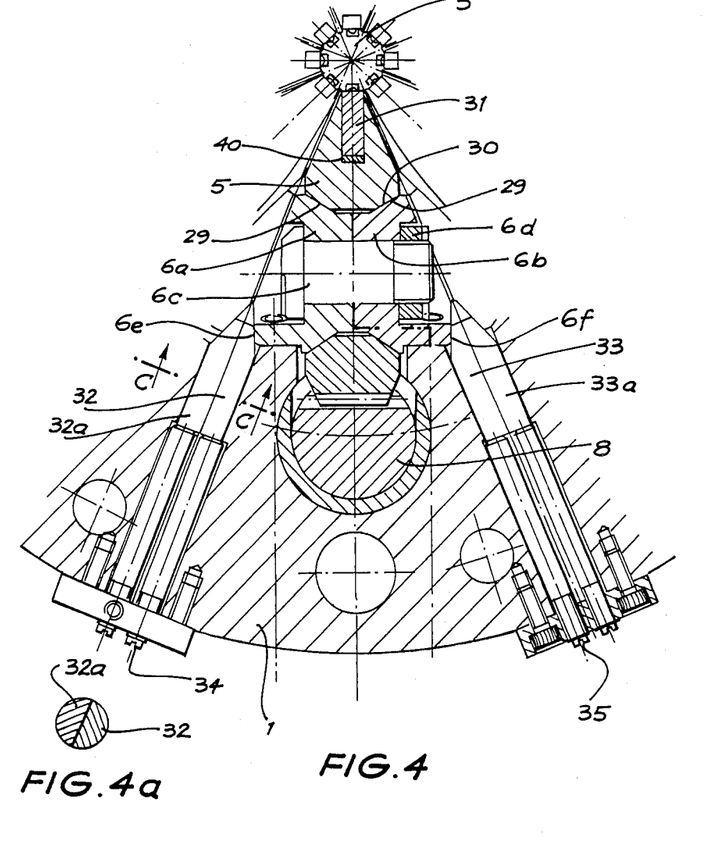
FIG. 4 is an enlarged view of part of FIG. 3.
FIG. 4a is a section on line CC of FIG. 4.

FIG. 3 is a combined front view of die head 1 and part section thereof on line BB and is enlarged in FIG. 4.

It will be seen that die head 1 consists of a solid steel disc having an octagonal recess in its front face to receive the cluster of axles 6. Each axle 6 comprises four elements: two stub axles 6a and 6b, bolt 6c and nut 6d. These stub axles have conical journal surfaces 29 that bear directly on conical journal areas 30 of die holders 5. Both axles and die holders are made of alloy steel, hardened by a process such as "Tufriding" which provides certain lubricating properties. The axles are also supplied with lubricating oil under pressure.

The above configuration employing opposed conical journals provides great stability stiffness of the die holders under roll imprinting loads, notwithstanding the limited space available for such journalling.

Imprinting dies 31 need to be supported with great accuracy and rigidity both in respect of lateral and radial movement, as seen in the sectional view of FIG. 3. They also require to be adjusted laterally precisely, which is accomplished by having flat-end faces 6e and 6f of axles 6a and 6b respectively abut tapered faces of wedges 32 and 33. These wedges are of semi-circular cross-section (see FIG. 4a) and abut corresponding wedges of the adjoining axles 32a and 33a respectively, and are arranged for independent radial adjustment in die head 1. Each wedge is adjusted radially in and out by screws 34 and 35. Thus, on adjusting screw 34 inwardly and screw 35 outwardly, the axle assembly shown in FIG. 4 will move to the right. For this purpose, bolts 36 in FIG. 5 are slackened, and subsequently re-tightened.

When all axles of die head 1 are correctly positioned, all sixteen wedges, as for example 32 and 33, will bear firmly gainst their corresponding wedges, for example 32a and 33a respectively, so forming a pre-loaded arrangement serving to carry lateral and radial forces originating in imprinting dies 31 into the massive body of die head 1.

Figure 5:
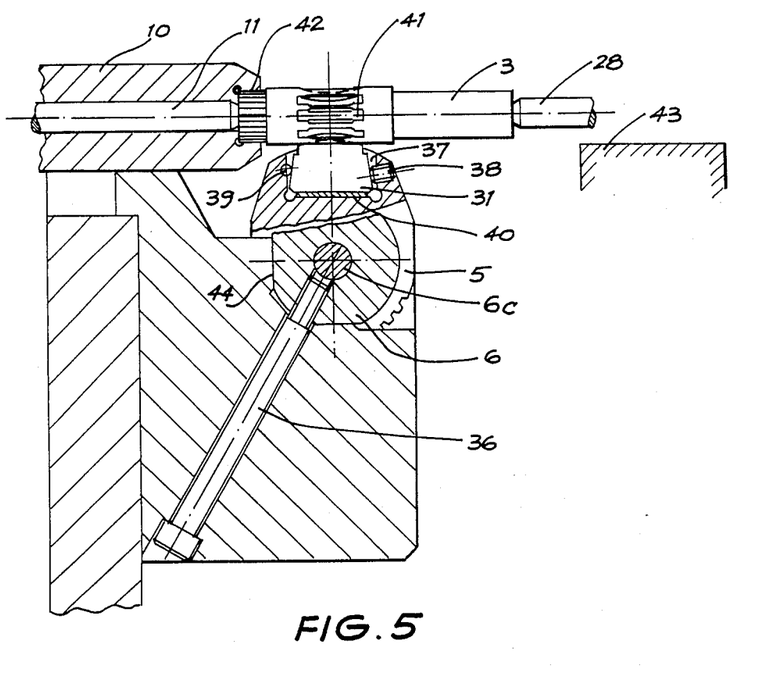
FIG. 5 is a section on line DD of FIG. 3.

In FIG. 5 it will be seen that stub axle 6 is secured rigidly in die head 1 by screw 36 which serves to pull the axle against location faces 44 of the octagonal recess formed in the face of die head 1. Imprinting die 31 is retained in a blind pocket 37, and is located end-wise by screw 38 which forces it against locating pin 39. Packer 40 is provided to accurately adjust the radial position of imprinting die 31. The arrangement provides for rigid and precise support of imprinting die 31 notwithstanding the slender proportion of die holder 5 in the area of the die necessary in such an eight roll die head.

Figure 5A:
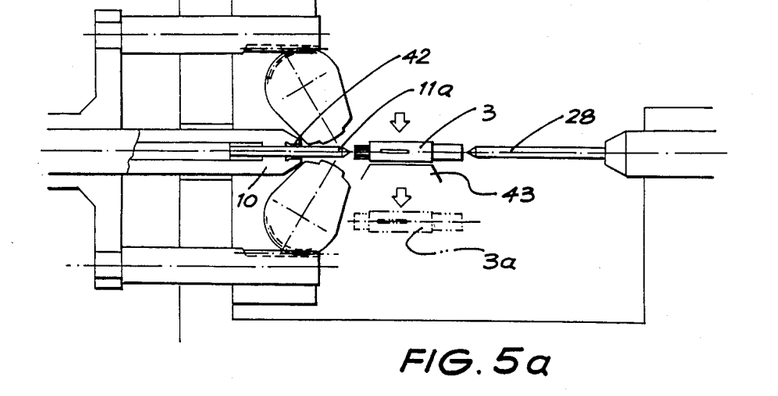
FIGS. 5a, b, c, d, e, and f are diagrammatic drawings showing the positions of various elements of the machine at different stages during the cycle of operation.
Figure 5B:
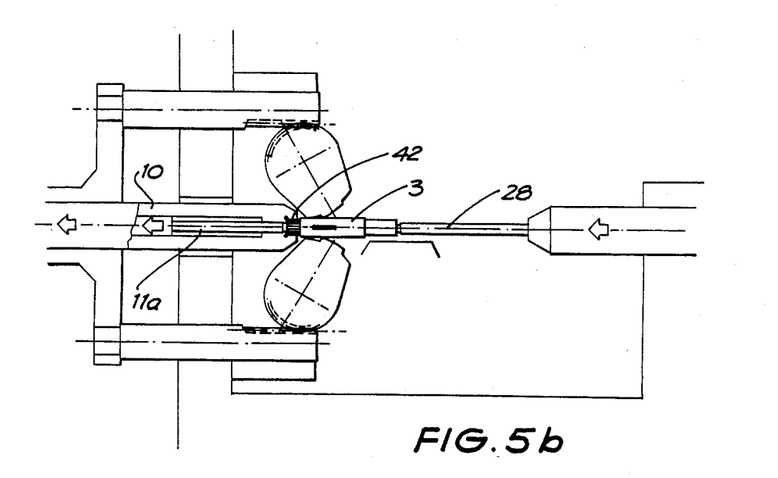
Figure 5C:
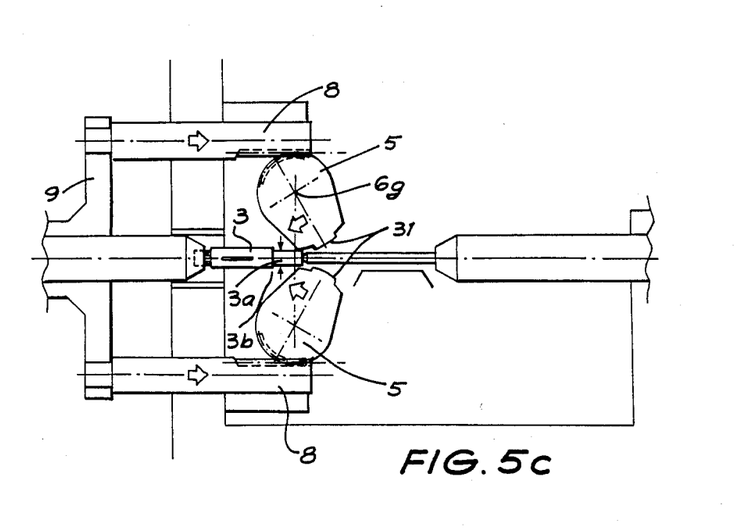

Referring now to FIGS. 5a-5f. FIG. 5a shows enlarged the situation referred to in the description of FIG. 1, namely, that valve core 3 rests on loading platform 43 ready to be replaced by the next component. All elements are stationary and centres 11a and 28 have separated due to centre 11a being arrested in its movement to the right just before centre 28 stops, as described earlier. As cam 36 rotates further, link rod 22 commences moving to the right causing centre 28 to move to the left carrying valve core 3 onto centre 11a, after which all three move together to carry the splined end of valve core 3 into engagement with the internal spline 42 formed in the end of spindle 10. In an alternative arrangement internal spline 42 may be incorporated in a collet housed within spindle 11 and opened and closed by suitable means well known in such art. At this point cam track 17 causes spindle 10 to also move to the left so that items 10, 11a, 3 and 28 all move to the left in a co-ordinated manner, as shown in FIG. 5b until their extreme position is reached. At this instant, cam track 19 causes spider 9 and racks 8 to commence moving to the right so causing all die holders 5 to rotate inwardly as shown in FIG. 5c.

Figure 5D:
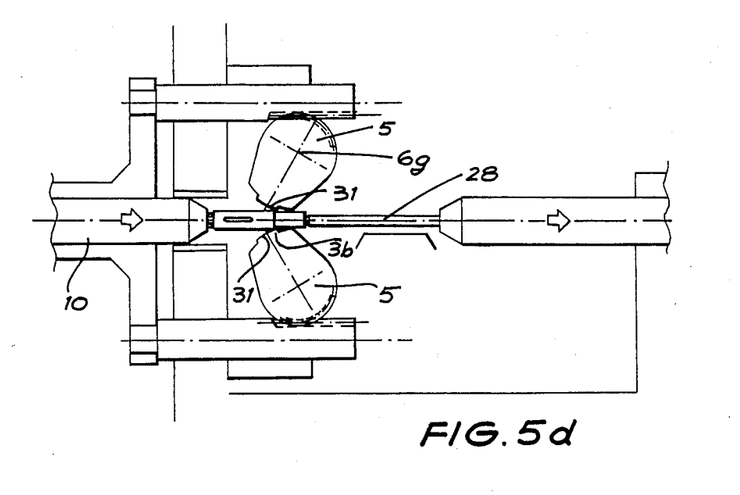

Now, typically valve core 3 has a reduced diameter 3a at some point 3b along its length, and it follows that, if 3b stops sufficiently to the left of the centre 6g of axles 6, die holders 5 may rotate to their extreme inward position shown in FIG. 5d without imprinting dies 31 contacting shoulder 3b. Die holders 5 now stop rotating and items 10, 11a, and 28 start carrying valve core 3 into the position ready for imprinting.

Figure 5E:
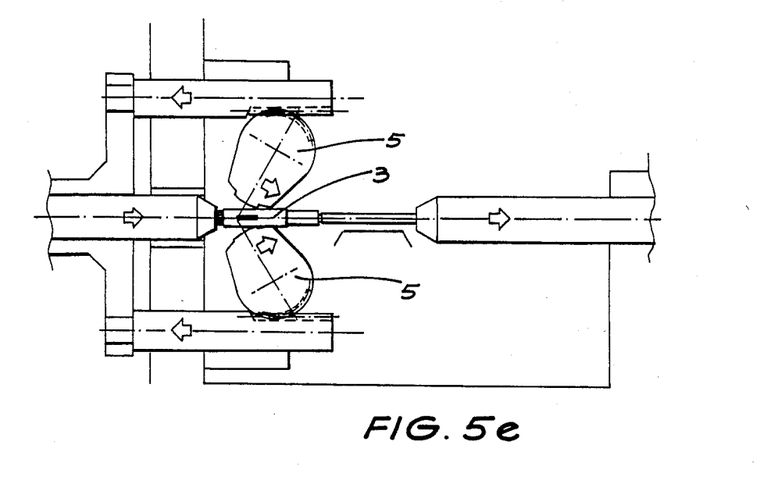

FIG. 5e shows the position where imprinting commences, with the motion of valve core 3 continuing as in FIG. 5d but die holders 5 commencing to rotate outwardly.

Figure 5F:
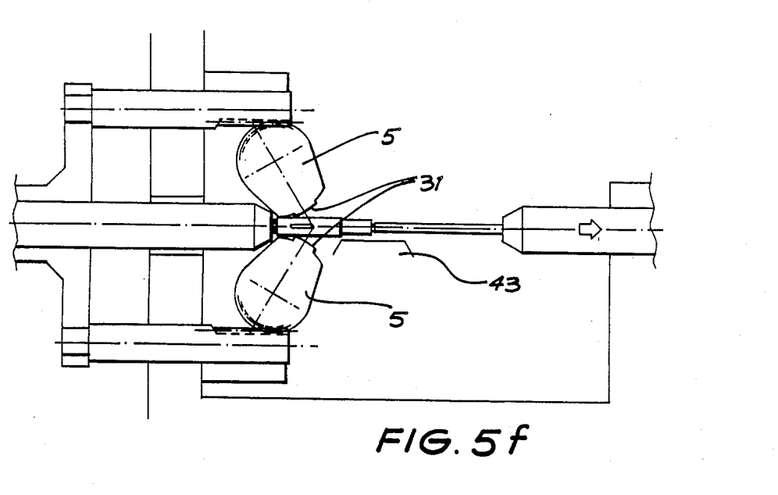

FIG. 5f shows the position where imprinting is complete, die holders 5 have readched their extreme outward position and have stopped. Items 10, 11a and 28 continue to move to the right to carry valve core 3 into the loading position shown in FIG. 5a and the cycle is complete.

We claim:

1. A die head for a roll imprinting machine for the imprinting of edges of grooves preformed in a valve core for a rotary valve for use in a power steering gear, the die head having means supporting a circular cluster of radially disposed rolling die holders, each die holder carrying at an inner end an arcuate imprinting die and being mounted for partial rotation on a transversely extending axle, each axle being constructed in two parts each part having a frusto-conical inwardly tapering face in rotational sliding contact with a similar face on the die holder carried by the axle, means being provided holding said parts in close contact, there being at the end of each axle a face and between each pair of axles positioning stop means secured to said die head abutting the face of each axle acting to restrain lateral movement of each axle thereby retaining said axles in a predetermined lateral positional relationship, means for effecting partial rotation of all said die holders synchronously, said means being arranged to act on each die holder at a position on the die holder more remote from the inner end of the die holder than the axle, and valve core locating means arranged to locate and hold said valve core at the center of said cluster for roll imprinting by said imprinting dies in a synchronous relationship.

2. A die head as claimed in claim 1 having in the inner end of each die holder a blind recess, the imprinting die being accommodated therein and means for securing the imprinting die securely in the recess.

3. A die head as claimed in claim 1 or claim 2 wherein each die holder has on a part remote from the inner end, a sector of gear teeth concentric with said axle and wherein the means for effecting partial rotation of the die holders simultaneously consists of a plurality of racks, one in engagement with the said sector of gear teeth of each die holder, supported in the die head for simultaneous linear movement parallel to the central axis of the cluster.

4. Apparatus for the imprinting of edges of grooves preformed in a valve core for a rotary valve for use in a power steering gear comprising a die head consisting of a single apertured steel member, a circular cluster of radially disposed rolling die holders mounted in said aperture each carrying at an inner end an arcuate imprinting die mounted for partial rotation in the die head and having an outer periphery on which is formed a sector of gear teeth, supporting means supporting said die head, a plurality of racks supported for reciprocating motion in said supporting means in a direction parallel to the axis of said cluster, said racks being in driving engagement with said sectors of gear teeth, a work spindle having at one end valve core holding means, means for reciprocating said racks simultaneously, means for reciprocating said work spindle and means for coordinating said reciprocating motions according to a predetermined relationship.

5. Appraratus as claimed in claim 4 wherein the means for reciprocating said racks simultaneously includes a spider arranged for reciprocation parallel to said work spindle axis having arms each attached at its outer end to one of said racks.

6. Apparatus as claimed in either of claims 4 or 5 wherein the means for reciprocating said racks simultaneously, the means for reciprocating said work spindle and the means for coordinating said reciprocating motion comprises a scroll cam having in its surface a plurality of cam tracks, the means for reciprocating the said racks and the work spindle each having cam follower means engaging one of said tracks, and means for rotating said scroll cam.

7. Apparatus as claimed in either of claims 4 or 5 wherein the valve core holding means consists in an internally splined cavity formed in said one end of the work spindle.

8. Apparatus as claimed in either of claims 4 or 5 having work feeding means including work engaging means to engage the ends of a valve core, means to reciprocate said work engaging means over a linear path on the central axis of said circular cluster, and means to coordinate the movements of said work engaging means with reciprocation of the work spindle and the racks, whereby a valve core is moved into and out of engagement with said valve core holding means and to and from a loading station.

* * * * *